US007056868B2

(12) United States Patent
Benton et al.

(10) Patent No.: US 7,056,868 B2
(45) Date of Patent: Jun. 6, 2006

(54) HYDROPHOBE ASSOCIATIVE POLYMERS AND COMPOSITIONS AND METHODS EMPLOYING THEM

(75) Inventors: William J. Benton, Magnolia, TX (US); Edward E. Miller, Plano, TX (US); Neil Magri, Katy, TX (US); John Toups, Sugarland, TX (US)

(73) Assignees: Cabot Corporation, Billerica, MA (US); Fritz Industries, Inc., Mesquite, TX (US)

( * ) Notice: Subject to any disclaimer, the term of this patent is extended or adjusted under 35 U.S.C. 154(b) by 255 days.

(21) Appl. No.: 09/918,410

(22) Filed: Jul. 30, 2001

(65) Prior Publication Data

US 2003/0114317 A1    Jun. 19, 2003

(51) Int. Cl.
*C09K 8/04* (2006.01)
(52) U.S. Cl. ............... 507/226; 507/121; 507/122; 507/227; 507/228; 526/287; 526/240; 524/282
(58) Field of Classification Search ......... 526/287, 526/240; 507/226, 227, 228, 121, 122
See application file for complete search history.

(56) References Cited

U.S. PATENT DOCUMENTS

| | | | | |
|---|---|---|---|---|
| 3,332,904 | A * | 7/1967 | La Combe et al. | 524/377 |
| 4,177,178 | A * | 12/1979 | Das et al. | 526/287 |
| 4,425,462 | A * | 1/1984 | Turner et al. | 507/228 |
| 4,599,390 | A * | 7/1986 | Fan et al. | 526/240 |
| 4,675,119 | A * | 6/1987 | Farrar et al. | 507/226 |
| 4,801,671 | A * | 1/1989 | Shay et al. | 526/287 |
| 5,089,578 | A * | 2/1992 | Valint et al. | 526/240 |
| 5,201,948 | A * | 4/1993 | Fasano et al. | 106/311 |
| 6,096,847 | A * | 8/2000 | LoSasso | 526/287 |
| 6,117,960 | A * | 9/2000 | Kohlhammer et al. | 526/287 |
| 6,239,081 | B1 | 5/2001 | Korzilius et al. | |
| 6,365,692 | B1 * | 4/2002 | Hill et al. | 526/287 |
| 6,423,802 | B1 * | 7/2002 | Miller et al. | 526/287 |
| 6,656,989 | B1 * | 12/2003 | Benton et al. | 524/394 |
| 2002/0111450 | A1 * | 8/2002 | Chang et al. | 526/287 |

FOREIGN PATENT DOCUMENTS

| | | |
|---|---|---|
| EP | 0621329 A1 | 10/1994 |
| WO | WO 9604348 | 2/1996 |
| WO | WO 0071635 | 11/2000 |

OTHER PUBLICATIONS

Written Opinion for PCT/US02/23755 (6pgs).
The International Search Report for PCT/US02/23755 (7pgs).

* cited by examiner

*Primary Examiner*—Philip C. Tucker
(74) *Attorney, Agent, or Firm*—Banner & Witcoff, Ltd.

(57) ABSTRACT

Water soluble associative polymers and compositions comprising them together with alkali metal salts of carboxylic acid are disclosed. Methods comprise introducing into a wellbore a fluid comprising such associative polymers and alkali metal salts of carboxylic acid, e.g., cesium formate. Disclosed water soluble associative polymers have functionality including at least sulfonate groups, carboxylate groups and hydrophobes associative with one another in a saturated aqueous solution of an alkali metal salt of a carboxylic acid. Water soluble associative polymers are formed as the polymerization reaction product of reactants comprising an AMPS reactant, an alpha, beta-unsaturated carbonyl reactant and a hydrophobe reactant selected from acrylic esters, methacrylic esters and a mixture of any of them, having a —COOR moiety wherein R is a hydrophobe which, as hydrophobe moieties of the resultant associative polymer, are associative with one another in a saturated aqueous solution of an alkali metal salt of a carboxylic acid.

35 Claims, 4 Drawing Sheets

HYDROPHOBE ASSOCIATIVE POLYMERS AND COMPOSITIONS AND METHODS EMPLOYING THEM

INTRODUCTION

This invention relates to certain polymer compositions, their preparation and their use. In particular, the invention relates to polymer compositions comprising certain polymers and alkali metal salts and to the use of such polymer compositions in viscosifying well-servicing fluids for oil field operations.

BACKGROUND

Various fluids or muds are used in oil and gas well drilling and operation. Such fluids are used to preventing the entry of solids into the subterranean formation, which could decrease the permeability of the formation, (2) using well completion fluids that do not tend to swell and/or disperse formation particles contacted by the completion fluid, (3) preventing the entry of formation particles into the perforations, and (4) avoiding excessive invasion of wellbore fluids into the formation. Specially formulated fluids are used in connection with drilling, completion, workover and other wellbore operations. Completion fluids are used after drilling is complete and during the steps of completion, or recompletion, of the well, such as cementing the casing, perforating the casing, and setting the tubing and pump. Workover fluids are used during remedial work in the well, such as removing tubing, replacing a pump, logging, reperforating, and cleaning out sand or other deposits. Many such treating fluids are aqueous or brine-based fluids. The fluid composition for a particular application generally depends on such considerations as fluid density, viscosity—to achieve desired solids-carrying capacity, and fluid loss control—to prevent excessive loss of fluid from the wellbore to the formation.

Effective viscosity and fluid loss control for temperatures below about 350° F. have been achieved by the addition of polymers to aqueous or brine-based fluids. Various chemicals are added to obtain the desired effects, including for example carboxymethyl cellulose, hydroxyethyl cellulose, xanthan gum, guar gum, polyanionic cellulose, and hydroxypropyl guar gum. Bridging agents have been added to the fluid together with polymers for fluid loss control, to form a bridge on the formation face to prevent fluid loss. The problem of fluid loss is increased at high temperatures and pressures encountered in deep wells.

Well servicing fluids have been suggested, such as in U.S. Pat. No. 5,620,947, including fluid composition using brines containing water soluble salts in particulate size, sometimes called "sized-salt." The fluids suggested there are said to be produced from a saturated brine solution, a water soluble sized salt that is insoluble in the saturated brine solution, and a water soluble polymer produced from at least two monomers of 2-acrylamido-2-methylpropanesulfonate, acrylamide or 2-vinylpyrrolidone, where the fluid is exposed to temperatures above 400° F. These fluids are said to address the known problem that polymer products used to suspend the salt particles and to supplement the bridging of salt particles are not temperature stable at temperatures above about 300° F. These higher temperatures can cause breakdown of viscosifiers and filtration control additives. For example, starch and xanthan gum degrade at about 225° F. to 250° F., carboxymethyl cellulose and guar gum degrade at about 250° F. to 300° F., and lignosulfonates begin to degrade at about 250° F. and are particularly unstable above about 325° F. Without adequate filtration control, formation damage can result.

The search for oil and gas has led to the drilling of deeper wells in recent years. Because of the temperature gradient in the earth's crust, deeper wells have higher bottomhole temperatures. A good workover and completion fluid should be Theologically stable over the entire range of temperatures to which it will be exposed, in order to suspend the particulate filtration and bridging additives. In deep wells, this can exceed 400° F. or even 425° F. or higher. Accordingly, there is a need for improved wellbore fluids, particularly for fluids that provide good viscosity and are thermally stable at temperatures above 400° F. or even 425° F. or higher.

In order to achieve a suitable density for use in well-drilling or other well servicing operations, it is conventional to use soluble polymers, such as polysaccharide polymers, in compositions further including water soluble salts, e.g., as described in UK patent 1,549,734 and U.S. Pat. No. 4,900,457. These salts are typically halide salts (e.g. chlorides and bromides) of mono- or divalent cations, such as sodium, potassium, calcium and zinc. Conventional water soluble polymers have deficiencies in typical uses. When the polymers are exposed to shearing conditions they are physically degraded to lower molecular weight polymers, thereby reducing the viscosity of the aqueous solution containing the polymers. In addition, aqueous solutions containing ionic water soluble polymers exhibit viscosity reduction when electrolytes are introduced to the solution, as is common in enhanced oil recovery. Finally, exposure of such aqueous solutions to high temperatures causes an undesirable degree of reduction in viscosity.

It is known to attach hydrophobic groups to polymers to modify the viscosity of an aqueous media solution containing the polymer. These rheology modifiers are generally known as associative polymers or hydrophobe associative polymers. In particular, these hydrophobized polymers in certain systems or solutions increase low shear thixotropy, high shear thinability, high solids loading, resistance to mechanical degradation and impart lubricity. Certain aqueous soluble hydrophobe associative copolymers are shown in published patent application WO 85/03510, the entire disclosure of which is hereby incorporated herein by reference in its entirety for all purposes. The copolymers of WO 85/03510 are said to be formed of an ethylenically unsaturated, water soluble monomer and an ethylenically unsaturated amphiphilic monomer having hydrophobic moieties that are capable of associating with each other in an aqueous medium containing a water soluble electrolyte. The copolymers are discussed for use in an aqueous medium together with such electrolyte and other ingredients common to mobility control fluids, fracturing fluids and drilling muds.

As noted above, a problem still faced in well drilling and other well servicing operations relates to thermal stability of well service fluids, such as completion fluids, work-over fluids and drilling fluids or muds, and especially thermal stability coupled with high density and viscosity. Temperatures in subsurface formations generally rise approximately 1° C. per hundred feet (30 meters) depth. Known aqueous polysaccharide compositions each has its own characteristic temperature above which it undergoes substantial degradation with undesirable reduction of viscosity, thus imposing limitations on its use in drilling operations below a corresponding depth. Additives, for example, blends of polymeric alkaline materials such as that sold by International Drilling Fluids (UK) Ltd., under the trademark "PTS 200," have been used to improve thermal stability of aqueous polysaccharide compositions. There remains a substantial need for good well service fluids that are thermally stable at high temperature, have good density and exhibit high and durable viscosity.

It is an object of the present invention to provide polymers and compositions meeting some or all of the industrial needs identified above. It is also an object of the invention to provide well servicing methods and the like employing such polymers and compositions.

SUMMARY

The present invention provides hydrophobe associative polymers, compositions and methods meeting some or all of the industrial needs mentioned above, including preferred embodiments operative as or in well servicing fluids that have good thermal stability and can be formulated with high viscosity and density. Such preferred embodiments of the compositions disclosed here comprise hydrophobe associative polymers, discussed further below, together with alkali metal salt of carboxylic acid. They exhibit high viscosity that is thermally stable, durable and recoverable, that is, high viscosity that develops when shear force is not being applied to the composition and, after being reduced by application of shear force, is redeveloped when the shear force is no longer being applied to the solution. Moreover, the compositions disclosed here can be formulated to have advantageously high density.

In accordance with one aspect, water soluble hydrophobe associative polymers are provided, having functionality including at least sulfonate groups, carboxylate groups and hydrophobes. In certain preferred embodiments, the hydrophobes are hydrocarbon groups, e.g., aliphatic side chains, associative with one another in a saturated aqueous solution of an alkali metal salt of a carboxylic acid. In accordance with certain preferred embodiments, hydrophobe associative polymers are provided that are highly soluble in saturated and other high concentration brines of alkali and metal salts of carboxylic acids, for example, cesium formate brine, to provide hydrophobized polymer compositions having sufficient density and excellent high temperature viscosity for well servicing fluids. High temperature viscosity is the viscosity of the fluid or composition at the elevated temperatures encountered by well servicing fluids, especially at temperatures over 400° F. or even over 425° F. or higher. Moreover, in accordance with at least certain preferred embodiments, the hydrophobe associative polymer compositions have "durable viscosity," that is, advantageously high viscosity that is maintained even after prolonged working of the well service fluid.

In accordance with another aspect, water soluble hydrophobe associative polymers are provided as the polymerization reaction product of reactants comprising:
AMPS reactant, preferably selected from acrylamidomethylpropanesulfonic acid, salts thereof and a mixture of any of them;
alpha, beta-unsaturated carbonyl reactant; and
hydrophobe reactant selected from acrylic esters, methacrylic esters and a mixture of any of them, having a —COOR moiety wherein R is a hydrophobe which, as moieties of the resultant hydrophobe associative polymer, are associative with one another in a saturated aqueous solution of an alkali metal salt of a carboxylic acid.

The polymerization reaction preferably is an addition polymerization and the hydrophobes themselves (as opposed to other functionality of the hydrophobe reactant) preferably are unreactive or at least substantially unreactive with the other polymerization reactants. Crosslinking reaction via the hydrophobe moieties during the polymerization reaction is generally undesireable, so that the hydrophobes remain available in the polymer reaction product to form the associative function stated above. It should be understood that references herein to the hydrophobe reactant by that term are not intended to mean that the reactant itself is necessarily hydrophobic overall, but rather that it provides hydrophobes to the reaction product polymer disclosed here. The polymerization reactants optionally further comprise crosslinking agent, preferably in minor amount.

In accordance with another aspect, a composition comprises any one or more of the hydrophobe associative polymers disclosed here, together with alkali metal salt of carboxylic acid, e.g., cesium formate. In accordance with certain preferred embodiments, such compositions are operative as well servicing fluids, especially as well servicing fluids suitable for use exposed to temperatures up to 400° F. and even up to 425° F.

In accordance with a method aspect, fluids or compositions as disclosed above are introduced into a wellbore. More specifically, such compositions comprise the above water soluble hydrophobe associative polymer having functionality including at least sulfonate groups, carboxylate groups and hydrophobes associative with one another in a saturated aqueous solution of an alkali metal salt of a carboxylic acid. The compositions further comprise alkali metal salt of carboxylic acid and can be formulated to have advantageously high and thermally stable viscosity that is recoverable, i.e., showing thixotropic properties, with high density, suitable to be used in high temperature applications as well servicing fluids such as drilling fluids, completion fluids, work-over fluids, etc.

Additional aspects and advantages of the present invention will be apparent to those skilled in the art from the following detailed description of certain preferred embodiments of the hydrophobe associative polymers, compositions and methods disclosed above.

BRIEF DESCRIPTION OF THE DRAWINGS

The following detailed discussion of certain preferred embodiments will refer to the apended drawings in which.

DETAILED DESCRIPTION OF CERTAIN PREFERRED EMBODIMENTS

Figure 1:
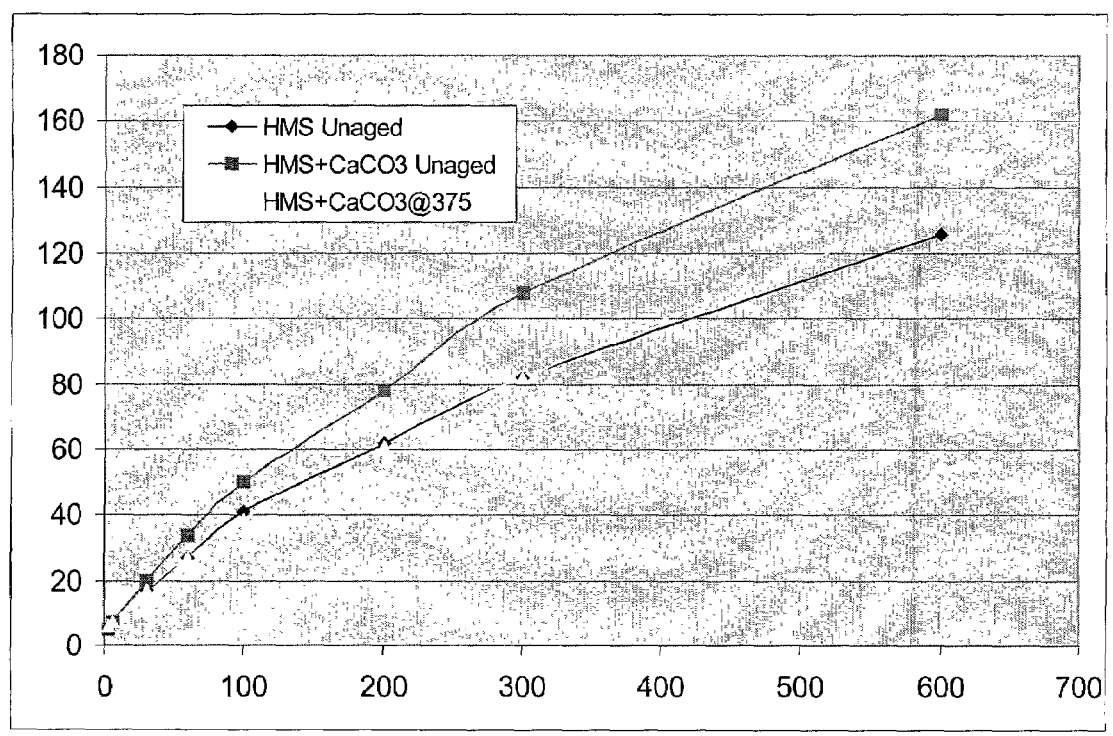
FIG. 1 is a graphical depiction of viscosity measurements for a composition in accordance with a first preferred embodiment employing hydrophobe associative polymer having stearyl side chain hydrophobes.

The hydrophobe associative polymers disclosed here should be understood to have hydrophobic moieties or "hydrophobes," preferably two or more hydrophobic sidechains pendant from the hydrophilic backbone of the water soluble polymer. Such functional groups of the polymer are referred to as hydrophobes in view of their hydrophobic nature and tendency to associate in an aqueous medium, but the polymers themselves are not hydrophobic overall within the usual qualitative meaning of that term as having a water-avoiding nature. The polymers disclosed here are sufficiently hydrophilic overall to be water soluble, while having hydrophobes acting in the general nature of a functional group of the polymer to associate with one another in an aqueous system. More specifically, the hydrophobes are associative with one another in a saturated aqueous solution of an alkali metal salt of a carboxylic acid so as to give the polymer generally thixotropic properties for durable, recoverable, viscosity that is thermally stable at temperatures of at least 400° F. and even as high as 425° F. or more. Thus, the hydrophobe associative polymers, while remaining overall or predominantly hydrophilic, contains a sufficient concentration of suitable hydrophobic moieties to enable them to associate with the hydrophobic moieties of other molecules of the hydrophobe associative polymer in an aqueous medium or in a saturated aqueous solution of an alkali metal salt of a carboxylic acid, and thus cause an increase in viscosity of the aqueous medium.

With reference to the hydrophobe associative polymers disclosed here, the term "water soluble" or "aqueous-soluble" or the like means that the polymer is soluble in water and aqueous solutions of alkali metal salts. In preferred embodiments, the polymer is soluble in an amount of at least 0.05 wt. %, preferably 0.1 wt %, more preferably at least about 0.05 wt. %, most preferably at least about 10.0 wt. %, e.g., about 20.0 wt. % in a saturated aqueous solution of an alkali metal salt of a carboxylic acid, most preferably being so soluble in a saturated aqueous solution of cesium formate, that is, a solution of about 80 wt. % cesium formate in about 20 wt. % water (not accounting for the polymer content). saturated or unsaturated solutions of sodium, potassium or cesium formate or sodium, potassium or cesium salt of acetic acid. While the hydrophobe associative polymers disclosed here are suitable also for use in other applications and in other compositions, as disclosed above and discussed further below, the hydrophobe associative polymers are especially well suited for use in compositions for well service fluids. In this regard, the compositions disclosed here can be referred to as solutions and include true solutions in which the individual polymer molecules are dispersed in the aqueous medium. Without wishing to be bound by theory, the compositions may in certain embodiments be in the form of, e.g., micellar or colloidal solutions wherein the polymer molecules are aggregated to some extent, the aggregates typically being no larger than colloidal size. In view of the relative weight percents of water and cesium formate or other carboxylate, there may be no free water in the composition, even prior to addition of the hydrophobe associative polymer (if the carboxylate is added first). The water content of the composition may be substantially entirely associated with the carboxylate, and the aforesaid saturated solutions could be said to be a solutions of water in carboxylate, rather than visa versa. For convenience, the compositions disclosed here are generally referred to here as aqueous solutions of the carboxylate. Thus, the novel polymers disclosed here are "water soluble" or "aqueous soluble," i.e., soluble in water or an aqueous solution, such as an aqueous solution of an alkali metal salt of a carboxylic acid, notwithstanding the hydrophobe functionality of the polymers and notwithstanding that the associative function of the hydrophobes renders the polymers thixotropic or high viscosity under low or no shear conditions.

The hydrophobe associative polymers may have any suitable polymeric form, including, for example, a linear, comb-like, or helical polymer form. Without wishing to be bound by theory, the hydrophobic moieties of the polymer are understood to be sufficiently sterically unhindered to associate with one another in sufficient degree when the polymer is in an aqueous medium and, more specifically, in a saturated aqueous solution of an alkali metal salt of a carboxylic acid, under low or no shear, thereby increasing the viscosity of the composition under those conditions. More specifically, and still not wishing to be bound by theory, it currently is understood that associative interactions between the hydrophobes in an aqueous medium, e.g., a saturated aqueous solution of cesium formate, contribute stability and viscosity while under low or no shear conditions. Under such conditions, the associative interactions break and reform up to some yield point. Up to this point, the fluid exhibits viscoelastic behavior. At higher shear rates the aqueous polymer composition passes through a transition from viscoelastic and thixotropic to shear thinning behavior. After shear forces are released or removed, it will relax to its viscoelastic behavior. This reversible viscosity or thixotropic behavior allows relatively lower molecular weight polymer compositions disclosed here to attain higher viscosities in low shear regions of a well servicing operation and suffer relatively lower mechanical degradation at high shear.

The hydrophobes of the hydrophobe associative polymers are preferably pendant organic groups, such as side chains pendant from the polymer backbone, more preferably hydrocarbon side chains. Preferably, the hydrophobes are hydrocarbon moieties, more preferably aliphatic moieties, although all of the hydrophobes need not be the same. In accordance with certain highly preferred embodiments, the hydrophobes are C4 to C24 alkyl, that is, straight or branched, preferably unsubstituted alkyl moieties having from 4 to 24 carbons, more preferably C6 to C20, most preferably C8 to C18, e.g., C12 to C13, such as lauryl, stearyl, 2-ethylhexyl or any mixture of these. Alternative hydrophobes include, for example, cycloalkyls, polynuclear aromatic hydrocarbon groups such as naphthyls; alkylaryls wherein the alkyl moiety has one or more carbons, preferably 4 to 8 carbons; haloalkyls of 4 or more carbons, preferably perfluoralkyls; polyalkyleneoxy groups wherein the alkylene is propylene or higher alkylene and there is one or more alkyleneoxy unit per hydrophobic moiety, or other hydrophobe of comparable or greater hydrophobicity. The concentration of hydrophobic moieties in the associative polymer is that which is sufficient to increase the viscosity of a saturated aqueous solution of an alkali metal salt of a carboxylic acid when the associative polymer is used in concentration as low as 0.1 weight percent. Preferably, the concentration of hydrophobe moieties in the hydrophobe associative polymer is such that, when 0.5 weight part of the polymer is dissolved in 100 weight parts of the saturated aqueous solution of an alkali metal salt of a carboxylic acid, the Brookfield viscosity is substantially higher than, e.g., at least twice, that of such saturated aqueous solution of an alkali metal salt of a carboxylic acid without the associative polymer and instead with the same weight amount of polymer identical in all respects to the associative polymer except that it does not contain the hydrophobes.

In addition to hydrophobes associative with one another in a saturated aqueous solution of an alkali metal salt of a carboxylic acid, the hydrophobe associative polymers disclosed here, in accordance with the first aspect disclosed above, have functionality further including at least sulfonate groups and carboxylate groups. In accordance with another disclosed aspect, hydrophobe associative polymers are provided as the polymerization reaction product, preferably the addition polymerization reaction product, of reactants including at least an AMPS reactant, an alpha, beta-unsaturated carbonyl reactant and a hydrophobe reactant. The AMPS reactant is selected preferably from AMPS acid or salt or mixtures thereof, preferably 2-acrylamido-2-methyl-propanesulfonic acid or salt thereof, or 2-methyl-2-[(1-oxo-2-propenyl)amino]-1-propanesulfonic acid or salt thereof. The carbonyl reactant preferably is a carbonyl compound selected from, methacrylic acid, maleic acid, fumaric acid, acrylic acid, salts thereof, and a mixture of any of them. Preferably, the alpha, beta-unsaturated carbonyl monomer is acrylic acid and/or alkali metal salts or ammonium salts of such carboxylic acid. The hydrophobe reactant preferably is alkylacrylate, alkylmethacrylate or a mixture of any of them, having a —COOR group where R is a monovalent, substituted or unsubstituted branched or unbranched, hydrophobic, C4 to C24 aliphatic moiety that is substantially nonreactive with the AMPS reactant and the carbonyl reactant. Preferably R is an alkyl moiety, more preferably an unsubstituted alkyl of at least 4 carbons, more preferably at least 8 carbons to provide greater hydrophobicity, most preferably at least 10 carbons, and preferably no more than about 24 carbons, more preferably no more than about 20 carbons, most preferably no more than about 18 carbons. Most preferably, the hydrophobe reactant is 2-ethylhexyl methacrylate, lauryl methacrylate, stearyl methacrylate or a mixture of any of them. The use of lauryl methacrylate, for example, is found to yield a hydrophobe associative polymer having exhibiting a high degree of thermal stability and a low degree of foaming and separation. In the well servicing industry it is desired to having well servicing fluids that do not excessively foam, since foaming can entrain air and can cause over-flowing in the oil well and separation of particles in the well servicing fluid composition. Defoaming agents can be added to the composition to control the amount of foaming but it is preferred to provide a well servicing fluid that does not require defoaming agents.

As disclosed above, moiety R of the reactant preferably is substantially nonreactive with the AMPS reactant during preparation of the water soluble polymer. Without wishing to be bound by theory, it presently is understood that the double bond of the carbonyl reactant is reactive with the AMPS reactant, but that moiety R should be nonreactive at least in the sense that it does not covalently or ionicly react with the AMPS reactant to cause the reaction product, i.e., the water soluble polymer, to be a three dimensional cross-linked polymeric network. In this regard, however, the R moieties of the water soluble polymer, in a use environment, are understood to be reactive with each other sufficiently to yield a hydrophobized water soluble polymer, that is, to provide a hydrophobic effect. Thus, while substantially nonreactive during preparation of the water soluble polymer, the R moieties provide a thixotropic, hydrophobized polymer composition. In certain preferred embodiments, substantially no other reactants are used in forming the hydrophobe associative polymer other than the AMPS reactant, the carbonyl reactant and the hydrophobe reactant.

Optionally, a cross-linking agent also is employed to achieve a higher molecular weight polymer reaction product. Alternatively, reaction conditions may be controlled or other techniques employed to achieve a desired molecular weight with or without the use of a cross-linking agent. When used, the cross-linking agent should be at least bifunctional, such as N,N'-methylenebis[2-propenamide] or the like. Numerous alternative reactants suitable for use as the AMPS reactant, the Carbonyl reactant, the hydrophobe reactant or the cross-linking reactant, as the case may be, are commercially available and/or readily prepared in accordance with known methods, and will be apparent to those skilled in the art given the benefit of this disclosure.

Preferably the water soluble hydrophobe associative polymer is prepared as the reaction product of 2-acrylamido-2-methylpropanesulfonic acid or 2-methyl-2-[(1-oxo-2-propenyl)amino]-1-propanesulfonic acid or salt thereof, with, methacrylic acid, maleic acid, fumaric acid, acrylic acid or salt thereof, a methacrylate having a —COOR group where R is stearyl, lauryl, ethylhexyl or other C8 to C18 alkyl, or a mixture of any of them, and a minor amount of bifunctional cross-linking agent such as N,N'-methylenebis[2-propenamide or the like. The water soluble polymer preferably has about 5 to 95 wt. %, more preferably about 30 to 80 wt. % structural units derived from 2-acrylamido-2-methylpropanesulfonic acid or other AMPS reactant, about 5 to 95 wt. %, more preferably about 20 to 60 wt. % structural units derived from acrylic acid or other carbonyl reactant, about 0.05 wt. % to 2.0 wt. %, more preferably about 0.2 wt. % to 1.0 wt. % structural units derived from alkylmethacrylate or other hydrophobe reactant, and about 0 to 5 wt. %, more preferably about 0 to 0.1 wt. % structural units derived from cross-linking agent. Preferred salts of the polymer include, for example, alkali metal salts, ammonium salts and the like. The molecular weight of preferred embodiments of the hydrophobe associative polymers disclosed here preferably is in a range suitable to be soluble and effective in well service fluids, preferably being soluble at least to the degree disclosed above in a saturated aqueous solution of an alkali metal salt, most preferably cesium formate. A saturated aqueous solution of cesium formate containing 1 ppb of preferred embodiments of the hydrophobe associative polymer can be subjected to a degree of shear on the order of 10,000 sec$^{-1}$ at a temperature of 400° F. without being degraded significantly. While embodiments of the associative polymers disclosed here having very high molecular weight, e.g., weight average molecular weight (MW) greater than 5 million, can be suitably employed, such polymers tend to degrade when subjected to high shear, e.g., shear in excess of 10,000 sec$^{-1}$— at elevated temperatures, e.g., temperatures up to 425° F. Accordingly, such polymers are less preferred for some applications. Preferred embodiments of the hydrophobe associative polymers have weight average molecular weights (MW) as determined by gel permeation chromatography in the range from about 200,000 to about 4 million, more preferably from about 1 million to about 3 million, most preferably from about 1,500,000 to about 3 million.

The hydrophobe reactant, such as the acrylate and methacrylate reactants disclosed above having a —COOR group where R is a monovalent hydrophobe substantially nonreactive with the AMPS reactant and the carbonyl reactant, distributes hydrophobic side chains throughout the hydrophobe associative polymers. Without wishing to be bound be theory, it presently is understood that when the hydrophobic side chains associate with one another in an aqueous medium, networks are formed by the bridging of the pendent hydrophobic groups by weak van der waals forces. The resulting gel structure increases viscosity of the fluid. Under low shear stress, the physical bonds break and reform up to some given yield point. Up to this point, the fluid structure exhibits viscoelastic behavior. At higher shear rates the physical bonds readily break and the structure will pass through a transition from viscoelastic and thixotropic to shear thinning behavior. This will result in the structure exhibiting a lower viscosity. After the shear forces are released, the structure will relax to its thixotropic condition as the hydrophobic bonds are restored. This reversible behavior is significantly advantageous in the engineering of a well servicing fluid. High viscosities can be attained in the low shear region yet at high shear, mechanical degradation will be reduced, thus expanding the range of field applications for which the fluid is suitable and extending the usable lifetime of the material.

Compositions disclosed here, as already discussed above, comprise water soluble hydrophobe associative polymer and alkali metal salt of carboxylic acid. In accordance with one aspect, the hydrophobe associative polymer has functionality including at least sulfonate groups, carboxylate groups and hydrophobes associative with one another in a saturated aqueous solution of an alkali metal salt of a carboxylic acid. In accordance with another aspect, the hydrophobe associative polymer is a polymerization reaction product of reactants comprising AMPS reactant, alpha, beta-unsaturated carbonyl reactant and hydrophobe reactant as discussed above. It will be apparent to those skilled in the art that quantities of other ingredients suitable to the intended use may be present in the composition. For example, compositions intended for use in or as a well drilling or other well servicing fluid may also contain, salts such as sulfates, nitrates and bicarbonates, and other ingredients. Such salts inevitably will be present where sea water or other naturally occurring brine is used in preparing the compositions. If desired, the hydrophobe associative polymer composition may also contain an antioxidant, e.g. 2-mercaptobenzothiazole and/or other suitable additives. When 2-mercaptobenzothiazole is used, it may be incorporated in the same proportion, w/v, as the water soluble polymer.

The following instructive text is quoted from WO 85/03510, which document also is incorporated above in its entirety for all purposes.

The hydrophobe associative copolymer is preferably an addition copolymer of a water-soluble ethylenically unsaturated monomer and an amphiphilic ethylenically unsaturated monomer having sufficient concentration of hydrophobic groups to enable the copolymer to associate with the hydrophobic groups of other molecules of the copolymer and sufficient concentration of nonionic, hydrophilic groups to enable the copolymer to control its hydro-philic-lyophilic balance. Thus, in the absence of electrolyte, the nonionic, hydrophilic groups of the amphiphilic monomeric portion of the copolymer are hydrated when the copolymer is dispersed in an aqueous medium. However, when electrolyte is then added to the aqueous medium, the hydrophilic groups of the amphiphilic monomer dehydrate and become hydrophobic.

Exemplary preferred polymers include copolymers of from 90 to 99.995, more preferably from 98 to 99.9, most preferably from 99 to 99.5, mole percent of one or more water-soluble monomers with from 0.005 to 10, more preferably from 0.1 to 2, most preferably from 0.5 to 1, mole percent of one or more amphiphilic monomers. For these copolymers, it is found that preferred amounts of amphiphilic monomer will vary with the molecular weight of the copolymer. For example, a hydrophobe associative copolymer having a weight average molecular weight near 200,000, preferably contains from 1 to 2 mole percent of the amphiphilic monomer. Alternatively, the copolymer having a weight average molecular weight of 2 million preferably contains from 0.02 to 0.1 mole percent of amphiphilic monomer, preferably from 0.05 to 0.1 mole percent. Also, the preferred percentage of amphiphilic monomer varies with the relative balance of hydrophilic moiety versus the hydrophobic moiety in the amphiphilic monomer. For example, as the balance shifts from hydrophilic to hydrophobic generally less amphiphilic monomer is employed. Conversely, if this balance shifts to more hydrophilic, then more of the amphiphilic monomer is required.

Suitable water-soluble monomers include those which are sufficiently water-soluble to form at least a 10 weight percent solution when dissolved in water and readily undergo addition polymerization to form polymers which are water-soluble. Exemplary water-soluble monomers include ethylenically unsaturated amides such as acrylamide, methacrylamide and fumaramide and their N-substituted derivatives such as 2-acrylamido-2-methylpropane sulfonic acid (AMPS), N -(dimethylaminomethyl)acrylamide as well as N-(trimethylammoniummethyl) acrylamide chloride and N-(trimethylammoniumpropyl) methacrylamide chloride; ethylenically unsaturated carboxylic acids such as acrylic acid, methacrylic acid, itaconic acid and fumaric acid; and other ethylenically unsaturated quaternary ammonium compounds such as vinylbenzyl trimethyl ammonium chloride, sulfoalkyl esters of unsaturated carboxylic acids such as 2-sulfoethyl methacrylate, aminoalkyl esters of unsaturated carboxylic acids such as 2-aminoethyl methacrylate, vinyl amines such as vinyl pyridine and vinyl morpholine, diallyl amines and diallyl ammonium compounds such as diallyl dimethyl ammonium chloride, vinyl heterocyclic amides such as vinyl pyrrolidone, vinylaryl sulfonates such as vinylbenzyl sulfonate as well as the salts of the foregoing monomers. Of the foregoing water-soluble monomers, acrylamide and combinations of acrylamide and acrylic acid, including salts of acrylic acid such as sodium acrylate or ammonium acrylate, are preferred. Acrylamide and combinations thereof with up to 75 mole percent of acrylic acid or salt thereof, based on total water-soluble monomer, are more preferred. Most preferred are polymers wherein the water-soluble monomer is a mixture of acrylamide with from 5 to 50 mole percent, especially from 5 to 30 mole percent of acrylic acid or salt thereof.

Suitable amphiphilic monomers include those which are (1) usually soluble in water at room temperature, but are water-insoluble at the temperature used to copolymerize the amphiphilic monomer with water-soluble monomer, e.g., about 60° C., and (2) ethylenically unsaturated compounds having hydrophobic groups and hydrophilic groups as defined hereinbefore. Preferred amphiphilic monomers include the higher alkyl (polyoxyethylene)$_x$ esters of α,β-ethylenically unsaturated carboxylic acids wherein x is a number from 2 to 40, most preferably from 5 to 40, and the higher alkyl has from 6 to 20 carbons, most preferably from 8 to 16. Examples of such esters include dodecyl poly(oxyethylene)$_{10}$ methacrylate, dodecyl poly(oxyethylene)$_{20}$ methacrylate, dodecyl poly(oxyethylene)$_{12}$ acrylate, tridecyl poly(oxyethylene)$_{14}$ methacrylate, tetradecyl poly(oxyethylene)$_{16}$ acrylate, bis(octa-decyl poly(oxyethylene)$_{12}$] itaconate, bis[hexadecyl poly(oxyethylene)$_{17}$] maleate, and other higher alkyl poly(oxyethylene) esters of acrylic acid, methacrylic acid, maleic anhydride, fumaric acid, itaconic acid and aconitic acid. Suitable amphiphilic monomers include alkylaryl poly(oxyethylene)x esters of the aforementioned unsaturated acids, especially those wherein alkyl has from 7 to 10 carbons and x is as defined before. Examples of such alkylaryl esters include nonyl-α-phenyl poly(oxyethylene)$_{10}$ acrylate, nonyl-α-phenyl poly(oxyethylene)$_{12}$ methacrylate, dodecyl-α-phenyl poly(oxyethylene)$_{20}$ methacrylate, and the like. Other suitable amphiphilic monomers include higher alkyl, copoly(oxyethylene/oxypropylene) esters of the aforementioned acids, N-(higher alkyl poly(oxyethylene)) acrylamides and methacrylamides, N-(higher alkyl copoly(oxyethylene/oxypropylene)) acrylamides and methacrylamides and the like. Of the preferred higher alkyl poly(oxyethylene)$_x$ esters, most preferred are those wherein alkyl. has from 8 to 16 carbons, x is from 5 to 40, and the acid portion is acrylate or methacrylate, e.g., dodecyl poly(oxyethylene)$_{10}$ methacrylate, dodecyl poly(oxyethylene)$_{20}$ methacrylate, and similar acrylate esters. In applications wherein hydrolysis is a problem such as in caustic floods, N-(higher alkyl copoly(oxyethylene/oxypropylene) acrylamides are the most preferred amphiphilic monomers.

The aforementioned hydrophobe associative copolymers are advantageously prepared by copolymerizing the water-soluble monomers with amphiphilic monomers in an aqueous medium containing a chelating agent that complexes with any existing polymerization inhibitors and an emulsifier that solubilizes the amphiphilic monomer in the aqueous medium. The polymerization techniques are typically those wherein the amphiphilic monomer or mixture of amphiphilic monomers is added with vigorous agitation to an aqueous solution of the water-soluble monomer or mixture of water-soluble monomers and solubilizing emulsifier. By solubilizing the amphiphilic monomer in the aqueous medium, it is meant the combination of aqueous medium, amphiphilic monomer and emulsifier gives the visual appearance of a-clear solution, preferably, the "solvated" particles of monomer are less than 200 Angstrom units. A chelating agent such as ethylenediamine tetraacetic acid (EDTA), the pentasodium salt of (carboxymethylimino)bis(ethylenenitrilo)tetraacetic acid, tetrasodium ethylenedinitrilotetraacetate or the trisodium salt of N-(carboxymethyl)-N'-(2-hydroxyethyl)-N,N'-ethylenediglycine is then added to the reaction mixture to complex metallic salts which are often present in water-soluble monomers such as acrylamide. The copolymerization is then preferably initiated by adding a polymerization initiator capable of generating free-radicals. Optionally, a chain transfer agent may be included in the polymerization reaction mixture.

The solubilizing emulsifier is required in most instances to suitably solubilize the amphiphilic monomer and to subsequently obtain a hydrophobe associative copolymer having a desirable concentration of hydrophobic moieties in the copolymer. It is believed that the amphiphilic monomer is solubilized in the micelles formed by the emulsifier. Thus, the emulsifier is generally employed in an amount which is above the critical micelle concentration (CMC) of the emulsifier, but less than that which reduces the concentration of amphiphilic monomer in the copolymer to a point that the hydrophobic groups of the copolymer will not associate in the presence of the electrolyte. Preferably, the concentration of emulsifier in the aqueous polymerization medium is from 2 to 4 times the CMC of the emulsifier. The amount of emulsifier used will also be such that there is at least one amphiphilic monomer molecule per micelle of the emulsifier, preferably from 1 to 10, most preferably from 2 to 5, amphiphilic monomer molecules per micelle. For example, when sodium dodecyl sulfate (NaDS) is employed as an emulsifier for dodecyl poly(oxyethylene)$_{10}$ methacrylate (DPMA), the molar ratio of DPMA to NaDS is at least 1:50 and up to 1:2, preferably from 1:5 to 1:25, most preferably from 1:10 to 1:15. By knowing the CMC, the hydrophilic-lipophilic balances (HLB) and aggregation number of molecules in the micelle molecular weight of an emulsifier and the hydrophobicity of the amphiphilic monomer, suitable molar ratios and appropriate emulsifier concentrations can be determined for any given amphiphilic monomer and emulsifier to provide similar suitable concentrations of hydrophobic moieties in the hydrophobe associative copolymer. In general mole ratios which will provide from 2 to 10, preferably from 4 to 5, molecules of the amphiphilic monomer per micelle of emulsifier are selected.

Suitable emulsifiers include anionic agents such as alkali metal salts of alkyl sulfates and alkyl and aryl sulfates, e.g., dodecyl alkyl sulfosuccinates and sodium dodecylbenzene sulfate; fatty acid soaps, e.g., sodium oleate, sodium stearate and potassium oleate; alkali metal salts of sulfonated fatty alcohols, e.g., sodium dodecyl sulfate; sulfates of ethoxylated alcohols; alkyl phosphate esters, e.g., dodecyl hydrogen phosphate; fluoro emulsifiers, e.g., perfluoroalkyl sulfates; and the like. Also included are cationic emulsifiers such as alkylamine hydrochlorides, e.g., dodecylamine hydrochloride and tridecylamine hydrochloride; quaternary alkyl or aryl ammonium halides such as dodecyl trimethyl ammonium chloride; ethoxylated fatty amines and other emulsifiers as described in *McCutcheon's Detergents and Emulsifiers*, North American Edition, 1980 Annual. In general, when the hydrophilic/hydrophobic polymer is anionic or nonionic, an anionic emulsifier such as an alkali metal alkyl sulfate is preferably employed as the emulsifier. When the hydrophobe associative copolymer is cationic, a cationic emulsifier such as dodecylamine hydrochloride is employed. When the hydrophobe associative copolymer is nonionic, anionic or cationic, a nonionic emulsifier such as nonylphenoxy polyethylene glycol having 10 ethyleneoxy units per molecule or other water-30-dispersible nonionic surfactants as defined herein is suitably employed.

Suitable chelating agents include those mentioned hereinbefore, with the pentasodium salt of (carboxymethylimino)bis(ethylenenitrilo)tetraacetic acid being preferred. When employed, the chelating agent is used in an amount in the range from 0.1 to 0.2, preferably from 0.1 to 0.15, weight percent based on the weight of total monomers.

Exemplary suitable polymerization initiators include the inorganic persulfates such as potassium persulfate, ammonium persulfate and sodium persulfate, azo catalysts such as azobisisobutyronitrile and dimethyl azoisobutyrate; organic peroxygen compounds such as benzyl peroxide, t-butyl peroxide, diisopropyl benzene hydroperoxide and t-butyl hydroperoxide. Of these initiators, the oil-soluble types such as the organic peroxides and azo compounds are preferred. It is desirable to employ from 0.01 to 0.1 weight percent of initiator based on the weight of total monomers.

The hydrophobe associative copolymers are readily recovered from the aqueous medium when such is desired by removal of water under vacuum or by azeotropic distillation or by drum drying. Alternatively, the aqueous medium containing the hydrophobe associative copolymer can be used as such.

It is also understood that hydrophobe associative copolymers of acrylamide, acrylic acid and amphiphilic monomer can be prepared by copolymerizing all three of these monomers or by copolymerizing acrylamide with the amphiphilic monomer and subsequently hydrolyzing a portion of the copolymerized acrylamide by contacting the copolymer with a base such as sodium hydroxide and/or sodium carbonate.

Composition disclosed here can be prepared by mixing alkali metal salt of carboxylic acid, the hydrophobe associative polymer, other desired ingredients and water or brine in any suitable order. In accordance with certain preferred embodiments, alkali metal salt of formic, acetic and/or other carboxylic acid is added to an aqueous solution containing the water soluble hydrophobe associative polymer with, when present, other salts and/or other ingredients. In accordance with another embodiment, the hydrophobe associative polymer composition described above, comprising the water soluble polymer and the alkali metal salt of carboxylic acid, optionally with other dry ingredients, intended for use in a well service fluid, is provided as a dry powder to which water or brine solution is added to hydrate the water soluble polymer and dissolve the alkali metal salt of carboxylic acid. In accordance with another embodiment, the water soluble polymer is added to a brine solution comprising the alkali metal salt. In accordance with certain typical embodiments operative to be used as well drilling fluids, the composition has water content of about 10 to 40% w/v. In accordance with certain preferred embodiments, the alkali metal salt of carboxylic acid used in the hydrophobe associative polymer compositions is sodium, potassium or cesium salt of carboxylic acid, or any mixture of them. As mentioned above, other salts may be present in substantial, minor or trace amounts. The use of cesium salt, especially saturated solutions of cesium formate or cesium acetate, in the compositions disclosed here provides higher density compositions than corresponding sodium or potassium compositions. Such higher density, especially in conjunction with the thermally stable, reversable, high temperature viscosity discussed above, yields well service fluids highly advantageous in applications not fully addressed by alternative technologies. More specifically, for example, aqueous hydrophobe associative polymer compositions using saturated cesium formate solutions have a density equal to or greater than corresponding compositions employing substantially saturated potassium solutions. Thus, in accordance with certain especially preferred embodiments, compositions are formulated with water soluble hydrophobe associative polymer in a saturated or near saturated cesium formate brine. More generally, the alkali metal salt of carboxylic acid is used typically in the compositions disclosed here in an amount ranging from about 40% w/w to fully saturated.

In compositions operative for use in or as a well service fluid, e.g., a completion fluid, a drilling fluid or a work-over fluid in a well drilling operation, the water soluble hydrophobe associative polymer preferably has a weight average molecular weight of at least about 1,000,000, more preferably from 1,000,000 to 5,000,000, most preferably 1,500,000 to 3,000,000.

In certain preferred embodiments, hydrophobe associative polymers are used in an amount of at least 4 lbs/bbl, more preferably at least 6 lbs/bbl in saturated alkali metal carboxylate brine solutions. Certain such preferred embodiments have retained substantially their original rheological properties at temperatures over 400° F. and even up to about 425° F. or higher after 700 hours, as tested by typical API recommended practices. Certain such preferred embodiments use hydrophobe associative polymer as described above in an amount of 0.05 to 10 wt. % and the alkali metal carboxylate in an amount of 45 to 90 wt. % to produce a substantially saturated or other concentration brine, to provide a well-servicing fluid which develops an apparent viscosity of at least 20 cPs., a plastic viscosity of at least 15 cPs., and a yield point of at least 5 lb/100 ft$^2$ when measured at a 120 degrees F. In accordance with certain highly preferred embodiments, the well-servicing fluid retains at least 30% of its apparent viscosity, and more preferably at least 50%, after roller aging for 700 hours at 375 degrees F. and measured at 120 degrees F.

The alkali metal salt of carboxylic acid used in the compositions disclosed here is preferably selected from sodium, potassium and cesium salts of suitable carboxylic acids, blended to obtain the desired density of the well service fluid. Preferably, acetates or, more preferably, formates are used. In accordance with certain preferred embodiments, the composition is 40% w/w or higher cesium formate. In accordance with certain highly preferred embodiments, at least about 5 wt. % of the alkali metal salt of carboxylic acid is cesium formate. Such embodiments are found to provide well service fluids having advantageous density and durable rheological properties. In that regard, the cesium fluids at about 43% of saturation are found to provide densities equal to the density of substantially saturated potassium brines. At concentrations higher than 43%, the cesium fluids advantageously provide even higher densities, such as 2.18–2.3 sg. As noted above, it is a significant and unexpected advantage of the hydrophobe associative polymers disclosed here, that they are sufficiently water soluble to yield high, durable, high-temperature viscosity suitable for well servicing fluids, in saturated or unsaturated solutions of alkali metal carboxylates. It is advantageous, for example, that the water soluble hydrophobe associative polymers disclosed above, having weight average molecular weight of 200,000 to 5,000,000 are soluble at least to levels of 0.05 to 5 wt. % (based on the weight of all solids contents of the composition) in an 80% or higher brine of alkali metal carboxylate, yielding an apparent viscosity greater than or equal to 20 cPs., a plastic viscosity of greater than or equal to 15 cPs., and a yield point of greater than or equal to 5 lb/100 ft$^2$ when dissolved in alkali metal formate brine solution at a concentration of 2 pounds per barrel and measured at 120 degrees F. Moreover, this advantageous rheology is durable, in that the aqueous hydrophobized polymeric compositions retain at least 50% of its apparent viscosity after roller aging for 30 days at 375 degrees F and measured at 120 degrees F.

The hydrophobe associative polymer compositions may further comprise other suitable ingredients, including, for example, alkali metal salts of at least 1 halide. Thus, for example, the polymer compositions may incorporate the sodium, potassium and/or cesium salts of chloride, bromide or mixtures thereof. In addition, minor amounts of suitable additive may be present in the hydrophobized polymer compositions, including, for example, any of the additives currently known for use in well servicing fluids of this general type.

The invention will be further understood from the following illustrative Examples.

EXAMPLE I

In this Example I a hydrophobe associative polymer in accordance with the above disclosure is synthesized. All amounts are in grams.

| | |
|---|---|
| 1. Acrylic acid | 68.45 g |
| 2. Lauryl methacrylate | 0.64 |
| 3. 0.1% Methylenebisacrylamide | 3.37 |
| 4. Deionized water | 99.58 |
| 5. Acrylamidopropanesulfonate | 49.22 |
| 6. 29% Ammonia | 69.61 |
| 7. 1% Sodium bromate | 0.50 |
| 8. 1% Sodium persulfate | 5.00 |
| 9. 1% Sodium metabisulfite | 1.50 |

Ingredients 1, 2, 3 and 4 were weighted into a 600 ml beaker. The beaker was placed in a water bath set at 5 degrees C with stirring. Ingredient 5 was then added and dissolved. When ingredient 5 was completely dissolved, ingredient 6 was added, keeping the temperature less than 30 degrees C. After ingredient 6 was completely added, the bath temperature was set to 30 degrees C. The beaker is sparged with nitrogen and after 60 minutes initiator ingredients 7 and 8 were added. The vessel was stirred for 5 minutes after which ingredient 9 was added and then stirred for one minute. Stirring and nitrogen sparge were stopped and the beaker was removed from the water bath and set in an insulated container where the temperature increased to about 100 degrees C. in 30 to 60 minutes. The polymer reaction product was dried to less than 10% moisture and then ground to a powder.

EXAMPLE II

To an 83% cesium formate (2.2 s.g.) solution, hydrophobe associative polymer prepared in the manner of Example I was added in the amount of 6 lb/bbl and tested by typical API test procedures as in "*Recommended Practice Standard Procedure for Field Testing Water-Based Drilling Fluids*" API Recommended Practice 13B-1 (RP 13B-1) First Edition, Jun. 1, 1990 (American National Standard, ANSI/API RP 13B-1-90 Approved: Jul. 12, 1993). The procedure commenced with weighing the dry polymer and cesium formate solution. In this example eight different solutions were formed and tested. The eight different solutions all were made with the same cesium formate base solution. The eight solutions differ in the hydrophobe associative polymer that was added to the cesium formate base solution. Each of the solutions is listed below in Table 1.

TABLE 1

| Sample # | 1 | 2 | 3 | 4 | 5 | 6 | 7 | 8 |
|---|---|---|---|---|---|---|---|---|
| HME, lb/bbl | 6 | — | — | — | 6 | — | — | — |
| HML, lb/bbl | — | 6 | — | — | — | 6 | — | — |
| HMS, lb/bbl | — | — | 6 | — | — | — | 6 | — |
| N Vis HB, lb/bbl | — | — | — | 2.5 | 2.5 | 2.5 | 2.5 | — |
| 4mate-vis-HT, lb/bbl | — | — | — | — | — | — | — | 6 |

N Vis HB is a micro-fibrous cellulosic material that is commercially available from Baroid (Houston, Tex.). 4mate-vis-HT is a polymer available from Cabot Specialty Fluids (Houston, Tex.), being similar to the hydrophobe associative polymer of Example I except that the 4mate-vis-HT polymer does not have the hydrophobe functionality of the hydrophobe associative polymer. HME is a hydrophobe associative polymer of the present invention wherein the hydrophobe moiety is 2-ethylhexyl, produced by the method of Example I using 2-ethylhexyl methacrylate as ingredient 2 in place of the lauryl methacrylate. HML is a hydrophobe associative polymer of the present invention wherein the hydrophobe moiety is lauryl, produced by the method of Example I using lauryl methacrylate as ingredient 2. HMS is a hydrophobe associative polymer of the present invention wherein the hydrophobe moiety is stearyl, produced by the method of Example I using stearyl methacrylate as ingredient 2 in place of the lauryl methacrylate.

In samples 4–7 where N Vis HB is used, the N Vis HB was added to the cesium formate base solution and stirred on a Waring Blender for five minutes. Next, the hydrophobe associative polymer was slowly added to the solution while stirring on a Hamilton Beach mixer. Each sample was then poured into a stainless steel "bomb" (a 350 ml lab barrel) and hot-rolled for 16 hours at 150° F. in accordance with the aforesaid API test procedures. After 16 hours, the samples were cooled down to 120° F. and the viscosities were read using a FANN 35 viscometer. The viscosities were read at several different rpm settings to calculate the plastic viscosity and yield point of each sample. The results are listed in Table 2 below.

TABLE 2

| Sample # | 1 | 2 | 3 | 4 | 5 | 6 | 7 | 8 |
|---|---|---|---|---|---|---|---|---|
| 600 rpm at 120° F. | 85 | 65 | 119 | 23 | 126 | 95 | 130 | 99 |
| 300 rpm at 120° F. | 50 | 36 | 82 | 14 | 79 | 58 | 82 | 61 |
| 200 rpm at 120° F. | 35 | 25 | 63 | 11 | 59 | 42 | 61 | 45 |
| 100 rpm at 120° F. | 18 | 14 | 36 | 7 | 36 | 25 | 36 | 26 |
| 6 rpm at 120° F. | 2 | 2 | 3 | 2 | 6 | 5 | 6 | 2 |
| 3 rpm at 120° F. | 1 | 2 | 1 | 1 | 4 | 4 | 4 | 1 |
| Plastic Viscosity, cP | 35 | 29 | 37 | 9 | 47 | 37 | 48 | 38 |
| Yield Point, #/100 ft$^2$ | 15 | 7 | 45 | 5 | 32 | 21 | 34 | 23 |
| Gels, 10 sec/10 min. | 1/2 | 1/2 | 1/3 | 2/3 | 4/5 | 3/5 | 4/5 | 1/2 |

Comparatively, the samples using the HML polymer were found to be the least foamy, while the samples using the HME polymer exhibited the most foaming.

EXAMPLE III

In this example four samples were prepared, including three hydrophobe associative polymer samples and one 4mate-vis-HT sample. The three hydrophobe associative polymers were samples 1–3 of Example II, i.e., a sample solution made with HME, a sample solution made with HML, and a sample solution made with HMS. The viscosity of each polymer sample was measured at 0.1 wt. % in deionized water using an OFI model 800 viscometer. Promising samples of each solution were then tested in cesium formate (2.2 s.g.) solution. The hydrophobe associative polymer compositions, and the 4mate-vis-HT, each were added to its corresponding cesium formate solution at 6 pounds per barrel. The viscosity of each sample was then measured using a FANN 35 viscometer at several rpm settings. The results from the viscometer testing are listed in Table 3 below.

TABLE 3

| Setting (rpm) | 600 | 300 | 200 | 100 | 60 | 30 | 6 | 3 |
|---|---|---|---|---|---|---|---|---|
| Control | 132 | 77 | 58 | 35 | 24 | 14 | 5 | 4 |
| HMS Unaged | 126 | 82 | 62 | 41 | 27 | 17 | 7 | 5 |
| HME Unaged | 92 | 64 | 45 | 30 | 20 | 13 | 6 | 5 |
| HML Unaged | 80 | 48 | 37 | 25 | 18 | 14 | 10 | 8 |

Next, 40 pounds per barrel of LoWate calcium carbonate was added to each of the sample solutions. LoWate is the trade name for commonly available M-I drilling fluids CaCO$_3$ additive. The viscosity of each sample was again measured, unaged, using a FANN 35 viscometer at several different rpm settings. The results are listed below in Table 4.

TABLE 4

| Setting (rpm) | 600 | 300 | 200 | 100 | 60 | 30 | 6 | 3 |
|---|---|---|---|---|---|---|---|---|
| Control + CaCO3 Unaged | 140 | 89 | 67 | 41 | 27 | 16 | 4 | 3 |

TABLE 4-continued

| Setting (rpm) | 600 | 300 | 200 | 100 | 60 | 30 | 6 | 3 |
|---|---|---|---|---|---|---|---|---|
| HMS + CaCO3 Unaged | 162 | 108 | 78 | 50 | 34 | 20 | 7 | 5 |
| HME + CaCO3 Unaged | 124 | 80 | 60 | 36 | 24 | 14 | 5 | 3 |
| HML + CaCO3 Unaged | 102 | 64 | 47 | 29 | 22 | 17 | 11 | 8 |

The samples were then each poured into a stainless steel "bomb" (a 350 ml lab barrel) and were hot-rolled for 16 hours at 375° F. After 16 hours, the samples were cooled down to 120° F. and the viscosities were read using a FANN 35 viscometer. The viscosities were read at several different rpm settings and the results are listed below in Table 5.

TABLE 5

| Setting (rpm) | 600 | 300 | 200 | 100 | 60 | 30 | 6 | 3 |
|---|---|---|---|---|---|---|---|---|
| Control + CaCO3 @ 375 | 82 | 48 | 35 | 21 | 15 | 10 | 6 | 4 |
| HMS + CaCO3 @ 375 | 134 | 82 | 61 | 39 | 27 | 17 | 7 | 6 |
| HME + CaCO3 @ 375 | 117 | 71 | 53 | 32 | 22 | 13 | 3 | 3 |
| HML + CaCO3 @ 375 | 92 | 55 | 40 | 24 | 16 | 9 | 3 | 3 |

Figure 2:
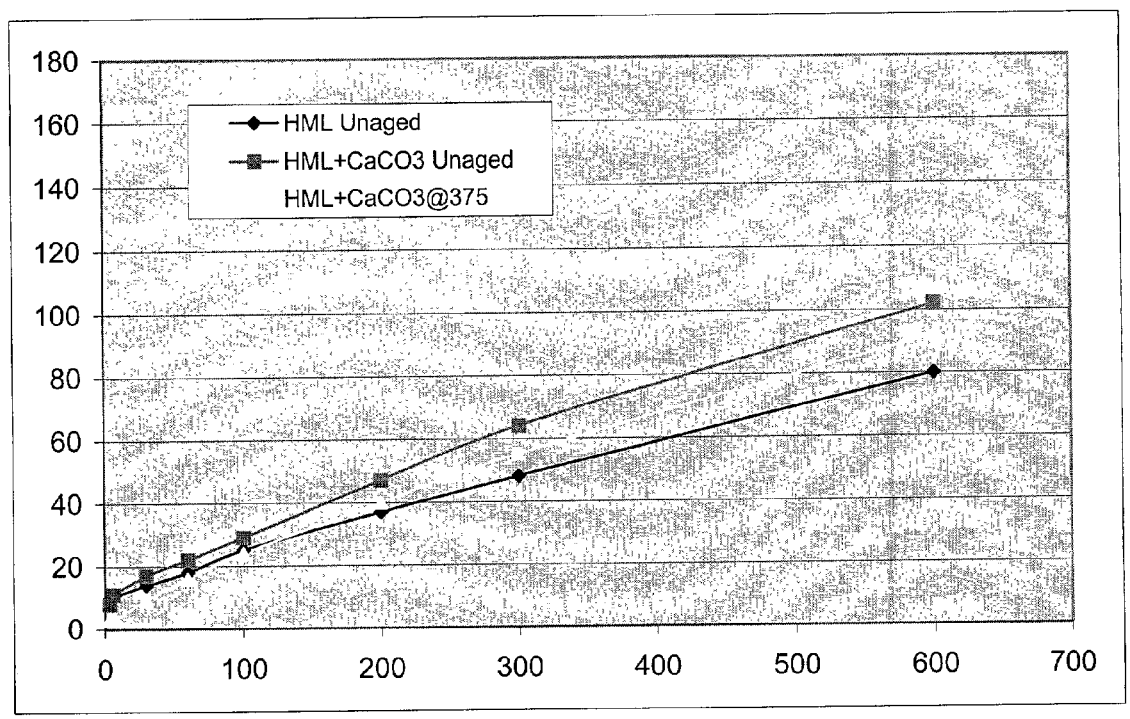
FIG. 2 is a graphical depiction of viscosity measurements for a composition in accordance with another preferred embodiment employing hydrophobe associative polymer having lauryl side chain hydrophobes.
Figure 3:
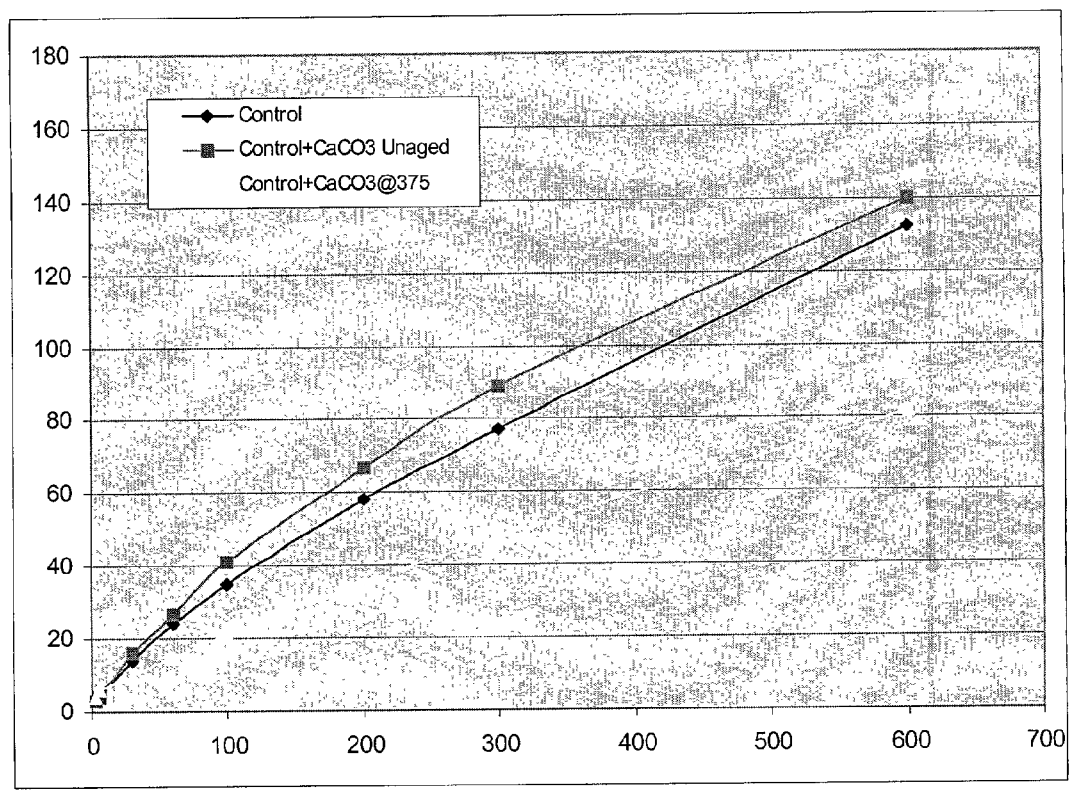
FIG. 3 is a graphical depiction of the viscosity measurements for a control polymer composition substantially identical to the polymers of FIGS. 1, 2 and 4, but not having their hydrophobe functionality.
Figure 4:
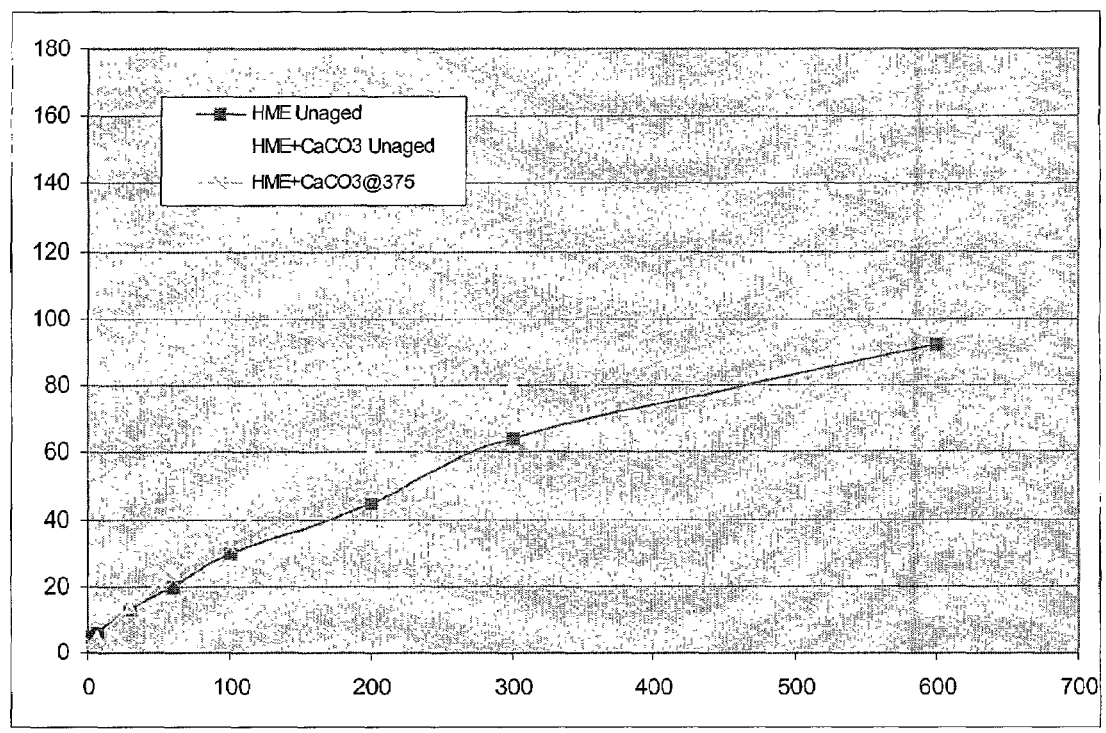
FIG. 4 is a graphical depiction of viscosity measurements for a composition in accordance with another preferred embodiment employing hydrophobe associative polymer having 2-ethylhexyl side chain hydrophobes.

The results of tables 2–5 are also shown in FIGS. 1–4, respectively.

EXAMPLE IV

To 350 ml of cesium formate (2.2 s.g.) solution, 4 lb/bbl of N Vis HB was added while stirring on a Waring Blender for 5 minutes. Next added were 4 lb/bbl of 4mate-vis-HT, 8 lb/bbl of the hydrophobe associative polymer "HML" described in Example II, 1.75 lb/bbl of potassium carbonate and 3.5 lb/bbl of MonoSurf, a commercially available surfactant (Cabot Specialty Fluids, Houston, Tex.), with stirring using a Hamilton Beach mixer. Initial rheology tests were conducted at 120° F. The results of these tests are listed below in Table 6.

TABLE 6

| Setting (rpm) | Viscosity (cP) |
|---|---|
| 600 | 174 |
| 300 | 113 |
| 200 | 86 |
| 100 | 55 |
| 6 | 9 |
| 3 | 7 |
| plastic viscosity, cP | 61 |
| yield point, #/100 ft$^2$ | 52 |
| gels, 10 sec/10 min | 6/7 |
| foaming | yes |

The solution was then hot-rolled for 16 hours at 150° F. The solution was then allowed to cool to 120° F. and the same rheology test was run again to calculate plastic viscosity and the yield point. The results are listed below in Table 7.

TABLE 7

| Setting (rpm) | Viscosity (cP) |
|---|---|
| 600 | 199 |
| 300 | 128 |
| 200 | 97 |
| 100 | 69 |

TABLE 7-continued

| Setting (rpm) | Viscosity (cP) |
|---|---|
| 6 | 9 |
| 3 | 7 |
| plastic viscosity, cP | 71 |
| yield point, #/100 ft$^2$ | 57 |
| gels, 10 sec/10 min | 6/7 |
| pH (1:10) | 8.9 |

A sample of the solution was set up in a test tube and placed in a Baroid static aging cell. The sample was static aged for 16 hours at 300° F. The sample was then cooled to 120° F. and the same rheology test was run again to calculate plastic viscosity and the yield point. These results are listed below in Table 8.

TABLE 8

| Setting (rpm) | Viscosity (cP) |
|---|---|
| 600 | 210 |
| 300 | 135 |
| 200 | 101 |
| 100 | 61 |
| 6 | 8 |
| 3 | 6 |
| plastic viscosity, cP | 75 |
| yield point, #/100 ft$^2$ | 60 |
| gels, 10 sec/10 min | 5/6 |
| pH (1:10) | 7.78 |
| shear, #/100 ft$^2$ | <50 |
| foaming | no |
| separation | no |

A sample of the solution was set up in a test tube and placed in a Baroid static aging cell. The sample was static aged for 16 hours at 375° F. The sample was then cooled to 120° F. and the same rheology test was run again to calculate plastic viscosity and the yield point. These results are listed below in Table 9.

TABLE 9

| Setting (rpm) | Viscosity (cP) |
|---|---|
| 600 | 157 |
| 300 | 100 |
| 200 | 76 |
| 100 | 49 |
| 6 | 13 |
| 3 | 10 |
| plastic viscosity, cP | 57 |
| yield point, #/100 ft$^2$ | 43 |
| gels, 10 sec/10 min | 10/12 |
| pH (1:10) | 8.07 |
| shear, #/100 ft$^2$ | <50 |
| foaming | no |
| separation | no |

EXAMPLE V

The procedure of Example 4 was repeated, except that 6 lb/bbl of N Vis HB was added. Initial rheology tests were conducted at 120° F. The results of these tests are listed below in Table 10.

TABLE 10

| Setting (rpm) | Viscosity (cP) |
|---|---|
| 600 | 194 |
| 300 | 126 |
| 200 | 98 |
| 100 | 54 |
| 6 | 13 |
| 3 | 10 |
| plastic viscosity, cP | 68 |
| yield point, #/100 ft$^2$ | 58 |
| gels, 10 sec/10 min | 8/11 |
| foaming | yes |

The solution was then hot-rolled for 16 hours at 150° F. The solution was then allowed to cool to 120° F. and the same rheology test was run again to calculate plastic viscosity and the yield point. These results are listed below in Table 11.

TABLE 11

| Setting (rpm) | Viscosity (cP) |
|---|---|
| 600 | 212 |
| 300 | 140 |
| 200 | 108 |
| 100 | 68 |
| 6 | 13 |
| 3 | 9 |
| plastic viscosity, cP | 72 |
| yield point, #/100 ft$^2$ | 68 |
| gels, 10 sec/ 10 min | 8/11 |
| pH (1:10) | 8.34 |

A sample of the solution was set up in a test tube and placed in a Baroid static aging cell. The sample was static aged for 16 hours at 300° F. The sample was then cooled to 120° F. and the same rheology test was run again to calculate plastic viscosity and the yield point. These results are listed below in Table 12.

TABLE 12

| Setting (rpm) | Viscosity (cP) |
|---|---|
| 600 | 224 |
| 300 | 148 |
| 200 | 106 |
| 100 | 74 |
| 6 | 18 |
| 3 | 13 |
| plastic viscosity, cP | 76 |
| yield point, #/100 ft$^2$ | 72 |
| gels, 10 sec/10 min | 12/13 |
| pH (1:10) | 7.58 |
| shear, #/100 ft$^2$ | <50 |
| foaming | no |
| separation | no |

A sample of the solution was set up in a test tube and placed in a Baroid static aging cell. The sample was static aged for 16 hours at 375° F. The sample was then cooled to 120° F. and the same rheology test was run again to calculate plastic viscosity and the yield point. These results are listed below in Table 13.

TABLE 13

| Setting (rpm) | Viscosity (cP) |
|---|---|
| 600 | 129 |
| 300 | 83 |
| 200 | 63 |
| 100 | 41 |
| 6 | 10 |
| 3 | 8 |
| plastic viscosity, cP | 46 |
| yield point, #/100 ft$^2$ | 37 |
| gels, 10 sec/10 min | 7/9 |
| pH (1:10) | 8.18 |
| shear, #/100 ft$^2$ | <50 |
| foaming | no |
| separation | no |

EXAMPLE VI

The procedure of Example V was repeated, except that only 2 lb/bbl of 4mate-vis-HT was added. Initial rheology tests were conducted at 120° F. The results of these tests are listed below in Table 14.

TABLE 14

| Setting (rpm) | Viscosity (cP) |
|---|---|
| 600 | 142 |
| 300 | 95 |
| 200 | 77 |
| 100 | 52 |
| 6 | 10 |
| 3 | 8 |
| plastic viscosity, cP | 47 |
| yield point, #/100 ft$^2$ | 48 |
| gels, 10 sec/10 min | 7/8 |
| foaming | yes |

The solution was then hot-rolled for 16 hours at 150° F. The solution was then allowed to cool to 120° F. and the same rheology test was run again to calculate plastic viscosity and the yield point. These results are listed below in Table 15.

TABLE 15

| Setting (rpm) | Viscosity (cP) |
|---|---|
| 600 | 176 |
| 300 | 117 |
| 200 | 89 |
| 100 | 57 |
| 6 | 10 |
| 3 | 7 |
| plastic viscosity, cP | 59 |
| yield point, #/100 ft$^2$ | 58 |
| gels, 10 sec/10 min | 6/7 |
| pH (1:10) | 8.43 |

A sample of the solution was set up in a test tube and placed in a Baroid static aging cell. The sample was static aged for 16 hours at 300° F. The sample was then cooled to 120° F. and the same rheology test was run again to calculate plastic viscosity and the yield point. These results are listed below in Table 16.

TABLE 16

| Setting (rpm) | Viscosity (cP) |
|---|---|
| 600 | 186 |
| 300 | 121 |
| 200 | 102 |
| 100 | 65 |
| 6 | 13 |
| 3 | 10 |
| plastic viscosity, cP | 65 |
| yield point, #/100 ft$^2$ | 56 |
| gels, 10 sec/10 min | 7/8 |
| pH (1:10) | 7.77 |
| shear, #/100 ft$^2$ | <50 |
| foaming | no |
| separation | no |

A sample of the solution was set up in a test tube and placed in a Baroid static aging cell. The sample was static aged for 16 hours at 375° F. The sample was then cooled to 120° F. and the same rheology test was run again to calculate plastic viscosity and the yield point. These results are listed below in Table 17.

TABLE 17

| Setting (rpm) | Viscosity (cP) |
|---|---|
| 600 | 106 |
| 300 | 72 |
| 200 | 59 |
| 100 | 40 |
| 6 | 13 |
| 3 | 9 |
| plastic viscosity, cP | 34 |
| yield point, #/100 ft$^2$ | 38 |
| gels, 10 sec/10 min | 8/10 |
| pH (1:10) | 8.37 |
| shear, #/100 ft$^2$ | <50 |
| foaming | no |
| separation | no |

EXAMPLE VII

The procedure of Example VI was repeated, except that only 3.82 lb/bbl of the hydrophobe associative polymer "HML" described in Example II was added. Initial rheology tests were conducted at 120° F. The results of these tests were listed below in

TABLE 18

| Setting (rpm) | Viscosity (cP) |
|---|---|
| 600 | 100 |
| 300 | 69 |
| 200 | 57 |
| 100 | 40 |
| 6 | 11 |
| 3 | 9 |
| plastic viscosity, cP | 31 |
| yield point, #/100 ft$^2$ | 38 |
| gels, 10 sec/10 min | 7/8 |
| foaming | yes |

The solution was then hot-rolled for 16 hours at 150° F. The solution was then allowed to cool to 120° F. and the same rheology test was run again to calculate plastic viscosity and the yield point. These results are listed below in Table 19.

TABLE 19

| Setting (rpm) | Viscosity (cP) |
|---|---|
| 600 | 125 |
| 300 | 82 |
| 200 | 63 |
| 100 | 43 |
| 6 | 11 |
| 3 | 8 |
| plastic viscosity, cP | 43 |
| yield point, #/100 ft$^2$ | 39 |
| gels, 10 sec/10 min | 7/8 |
| pH (1:10) | 8.79 |

A sample of the solution was set up in a test tube and placed in a Baroid static aging cell. The sample was static aged for 16 hours at 300° F. The sample was then cooled to 120° F. and the same rheology test was run again to calculate plastic viscosity and the yield point. These results are listed below in Table 20.

TABLE 20

| Setting (rpm) | Viscosity (cP) |
|---|---|
| 600 | 118 |
| 300 | 86 |
| 200 | 61 |
| 100 | 43 |
| 6 | 10 |
| 3 | 8 |
| plastic viscosity, cP | 32 |
| yield point, #/100 ft$^2$ | 54 |
| gels, 10 sec/10 min | 7/7 |
| pH (1:10) | 8.50 |
| shear, #/100 ft$^2$ | <50 |
| foaming | no |
| separation | no |

A sample of the solution was set up in a test tube and placed in a Baroid static aging cell. The sample was static aged for 16 hours at 375° F. The sample was then cooled to 120° F. and the same rheology test was run again to calculate plastic viscosity and the yield point. These results are listed below in Table 21.

TABLE 21

| Setting (rpm) | Viscosity (cP) |
|---|---|
| 600 | 132 |
| 300 | 81 |
| 200 | 60 |
| 100 | 37 |
| 6 | 7 |
| 3 | 5 |
| plastic viscosity, cP | 51 |
| yield point, #/100 ft$^2$ | 30 |
| gels, 10 sec/10 min | 5/7 |
| pH (1:10) | 8.25 |
| shear, #/100 ft$^2$ | <50 |
| foaming | no |
| separation | no |

The foregoing detailed description of preferred embodiments is intended to be exemplary of the invention and illustrative. Modifications of the embodiments disclosed and alternative embodiments will be apparent to those skilled in the art in view of the above, and all such modifications and alternatives are intended to be within the scope of appropriate ones of the following claims.

What is claimed is:

1. A composition comprising:
    water soluble associative polymer having functionality including at least sulfonate groups, carboxylate groups and hydrophobes associative with one another in a saturated aqueous solution of an alkali metal salt of a carboxylic acid; and
    alkali metal salt of carboxylic acid.

2. The composition of claim 1 wherein the associative polymer is soluble in an amount of at least 0.05 wt. % in a saturated aqueous solution of cesium formate.

3. The composition of claim 1 wherein the associative polymer is soluble in an amount of at least 0.5 wt. % in a saturated aqueous solution of cesium formate.

4. The composition of claim 1 wherein the hydrophobes of the associative polymer are hydrocarbon side chains pendant from a backbone of the associative polymer.

5. The composition of claim 1 wherein the hydrophobes of the associative polymer are aliphatic side chains pendant from a backbone of the associative polymer.

6. The composition of claim 5 wherein at least a majority of the aliphatic side chains pendant from a backbone of the associative polymer are alkyl side chains.

7. The composition of claim 6 wherein at least a majority of the alkyl side chains are unsubstituted C4 to C24 alkyl side chains pendant from the backbone of the associative polymer.

8. The composition of claim 6 wherein at least a majority of the alkyl side chains are unsubstituted C10 to C18 alkyl side chains pendant from the backbone of the associative polymer.

9. The composition of claim 5 wherein at least a majority of the alkyl side chains are any of stearyl, lauryl and ethylhexyl.

10. The composition of claim 1 wherein the polymer has a weight average molecular weight of
    at least 200,000, and
    not more than 5,000,000.

11. The composition of claim 1 wherein the alkali metal salt of carboxylic acid is selected from alkali metal salts of formic acid, acetic acid and mixtures thereof.

12. The composition of claim 1 wherein the alkali metal salt of carboxylic acid is selected from sodium, potassium and cesium salts of formic acid, and mixtures thereof.

13. The composition of claim 1 wherein
    the polymer is at least 0.1 wt. % of the composition, and
    the alkali metal salt of carboxylic acid is at least 60.0 wt. % of the composition.

14. A composition comprising:
    water soluble associative polymer formed as the polymerization reaction product of reactants comprising:
        AMPS reactant selected from acrylamidomethylpropanesulfonic acid, salts thereof and a mixture of any of them,
        alpha, beta-unsaturated carbonyl compound different from the AMPS reactant, and
        hydrophobe reactant different from the AMPS reactant and different from the alpha, beta-unsaturated carbonyl compound, the hydrophobe reactant selected from acrylic esters, methacrylic esters and a mixture of any of them, having a —COOR moiety wherein R is a hydrophobe which, as moieties of the resultant associative polymer, are associative with one another in a saturated aqueous solution of an alkali metal salt of a carboxylic acid; and
    alkali metal salt of carboxylic acid.

15. A composition comprising:
    water soluble associative polymer formed as the polymerization reaction product of reactants comprising:
        AMPS reactant selected from acrylamidomethylpropanesulfonic acid, salts thereof and a mixture of any of them,
        alpha, beta-unsaturated carboxylic acid compound different from the AMPS reactant, and
        hydrophobe reactant different from the AMPS reactant and different from the alpha, beta-unsaturated carboxylic acid compound, the hydrophobe reactant selected from acrylic esters, methacrylic esters and a mixture of any of them, having a —COOR moiety wherein R is a hydrophobe which, as moieties of the resultant associative polymer, are associative with one another in a saturated aqueous solution of an alkali metal salt of a carboxylic acid; and
    alkali metal salt of carboxylic acid.

16. A composition comprising:
    water soluble associative polymer formed as the polymerization reaction product of reactants comprising:
        AMPS reactant selected from acrylamidomethylpropanesulfonic acid, salts thereof and a mixture of any of them,
        alpha, beta-unsaturated carbonyl compound different from the AMPS reactant, and
        hydrophobe reactant different from the AMPS reactant and different from the alpha, beta-unsaturated carbonyl compound, the hydrophobe reactant selected from acrylic esters, methacrylic esters and a mixture of any of them, having a —COOR moiety wherein R is a hydrophobe which, as moieties of the resultant associative polymer, are associative with one another in a saturated aqueous solution of an alkali metal salt of a carboxylic acid; and
    alkali metal salt of carboxylic acid,
    wherein the alpha, beta-unsaturated carbonyl compound is selected from methacrylic acid, maleic acid, fumaric acid, acrylic acid, salts thereof, and a mixture of any of them.

17. The composition of claim 15 wherein the hydrophobe reactant is selected from alkyl acrylate, alkyl methacrylate and a mixture of any of them, the alkyl moiety being unsubstituted C4 to C24 alkyl.

18. The composition of claim 15 wherein the hydrophobe reactant is selected from alkyl acrylate, alkyl methacrylate and a mixture of any of them, the alkyl moiety being unsubstituted C8 to C18 alkyl.

19. The composition of claim 15 wherein the hydrophobe reactant is selected from stearyl methacrylate, lauryl methacrylate, and ethylhexyl methacrylate.

20. The composition of claim 15 wherein the hydrophobe associative polymer has:
    5 to 95 wt. % structural units derived from the AMPS reactant;
    5 to 95 wt. % structural units derived from the alpha, beta-unsaturated carboxylic acid compound; and
    0.2 to 2.0 wt. % structural units derived from the hydrophobe reactant.

21. The composition of claim 15 wherein the reactants further comprise a cross-linking agent.

22. The composition of claim 21 wherein the cross-linking agent is N,N'-methylenebis[2-propenamide].

23. The composition of claim 21 wherein the water soluble associative polymer has: 0 to 5 wt. % structural units derived from the cross-linking agent.

24. The composition of claim 15 further comprising alkali metal salt of at least 1 halide.

25. The composition of claim 24 wherein the alkali metal salt of at least 1 halide is selected from the sodium, potassium and cesium salts of chloride, bromide and mixtures thereof.

26. The composition of claim 15 developing an apparent viscosity of at least 20 cPs, a plastic viscosity of at least 15 cPs, and a yield point of at least 5 lbs/100 ft$^2$ when dissolved in saturated aqueous cesium formate solution and measured at 120° F.

27. The composition of claim 25 retaining at least 30 percent of its apparent viscosity after roller aging for 700 hours at 375 degrees F. and measured at 120 degrees F.

28. An aqueous well service fluid comprising:
water soluble associative polymer formed as the polymerization reaction product of reactants comprising:
AMPS reactant selected from acrylamidomethylpropanesulfonic acid, salts thereof and a mixture of any of them,
alpha, beta-unsaturated carbonyl compound different from the AMPS reactant, and
hydrophobe reactant different from the AMPS reactant and different from the alpha, beta-unsaturated carbonyl compound, the hydrophobe reactant selected from acrylic esters, methacrylic esters and a mixture of any of them, having a —COOR moiety wherein R is a hydrophobe which, as moieties of the resultant associative polymer, are associative with one another in a saturated aqueous solution of an alkali metal salt of a carboxylic acid; and
alkali metal salt of carboxylic acid.

29. A method comprising introducing into a wellbore a fluid comprising:
water soluble associative polymer having functionality including at least sulfonate groups, carboxylate groups and hydrophobes associative with one another in a saturated aqueous solution of an alkali metal salt of a carboxylic acid; and
alkali metal salt of carboxylic acid.

30. The method of claim 29 wherein said fluid is exposed to temperatures up to 425 degrees F.

31. A method comprising introducing into a wellbore a fluid comprising
water soluble associative polymer formed as the polymerization reaction product of reactants comprising:
AMPS reactant selected from acrylamidomethylpropanesulfonic acid, salts thereof and a mixture of any of them,
alpha, beta-unsaturated carbonyl compound different from the AMPS reactant, and
hydrophobe reactant different from the AMPS reactant and different from the alpha, beta-unsaturated carbonyl compound, the hydrophobe reactant selected from acrylic esters, methacrylic esters and a mixture of any of them, having a —COOR moiety wherein R is a hydrophobe which, as moieties of the resultant associative polymer, are associative with one another in a saturated aqueous solution of an alkali metal salt of a carboxylic acid; and
alkali metal salt of carboxylic acid.

32. A composition comprising:
water soluble associative polymer formed as the polymerization reaction product of reactants comprising:
AMPS reactant selected from acrylamidomethylpropanesulfonic acid, salts thereof and a mixture of any of them,
alpha, beta-unsaturated carboxylic acid compound, and
hydrophobe reactant selected from acrylic esters, methacrylic esters and a mixture of any of them, having a —COOR moiety wherein R is a hydrophobe which, as moieties of the resultant associative polymer, are associative with one another in a saturated aqueous solution of an alkali metal salt of a carboxylic acid; and
alkali metal salt of carboxylic acid.

33. The composition of claim 15 wherein the AMPS reactant is selected from 2-acrylamido-2-methylpropanesulfonic acid or salt thereof and 2-methyl-2-[(1-oxo-2-propenyl)amino]-1-propanesulfonic acid or salt thereof.

34. An aqueous well service fluid comprising:
water soluble associative polymer formed as the polymerization reaction product of reactants comprising:
AMPS reactant selected from acrylamidomethylpropanesulfonic acid, salts thereof and a mixture of any of them,
alpha, beta-unsaturated carboxylic acid compound different from the AMPS reactant, and
hydrophobe reactant different from the AMPS reactant and different from the alpha, beta-unsaturated carboxylic acid compound, the hydrophobe reactant selected from acrylic esters, methacrylic esters and a mixture of any of them, having a —COOR moiety wherein R is a hydrophobe which, as moieties of the resultant associative polymer, are associative with one another in a saturated aqueous solution of an alkali metal salt of a carboxylic acid; and
alkali metal salt of carboxylic acid.

35. A method comprising introducing into a wellbore a fluid comprising
water soluble associative polymer formed as the polymerization reaction product of reactants comprising:
AMPS reactant selected from acrylamidomethylpropanesulfonic acid, salts thereof and a mixture of any of them,
alpha, beta-unsaturated carboxylic acid compound different from the AMPS reactant, and
hydrophobe reactant different from the AMPS reactant and different from the alpha, beta-unsaturated carboxylic acid compound, the hydrophobe reactant selected from acrylic esters, methacrylic esters and a mixture of any of them, having a —COOR moiety wherein R is a hydrophobe which, as moieties of the resultant associative polymer, are associative with one another in a saturated aqueous solution of an alkali metal salt of a carboxylic acid; and
alkali metal salt of carboxylic acid.

* * * * *